United States Patent [19]
Morris

[11] Patent Number: 5,524,549
[45] Date of Patent: Jun. 11, 1996

[54] ARTIFICIAL FLOATING ISLAND

[76] Inventor: Richard D. Morris, 1440 Poinciana Ave., Ft. Myers, Fla. 33901

[21] Appl. No.: 436,088

[22] Filed: May 8, 1995

Related U.S. Application Data

[63] Continuation of Ser. No. 167,062, Dec. 16, 1993, Pat. No. 5,421,282.

[51] Int. Cl.$^6$ ................................................ B63B 35/44
[52] U.S. Cl. ................................... 114/264; 114/267
[58] Field of Search .................................. 114/256, 258, 114/264, 265, 266, 267, 121, 122, 123, 125; 14/2.6

[56] References Cited

U.S. PATENT DOCUMENTS

| | | |
|---|---|---|
| 1,667,255 | 4/1928 | Hermanson . |
| 2,448,542 | 11/1949 | Houghtaling . |
| 3,118,408 | 1/1964 | Knapp . |
| 3,276,209 | 10/1966 | Mosdell . |
| 3,426,109 | 2/1969 | Dempster . |
| 3,490,407 | 1/1970 | Dempster . |
| 3,951,085 | 4/1976 | Johnson . |
| 4,067,285 | 1/1978 | Jones . |

FOREIGN PATENT DOCUMENTS

| | | |
|---|---|---|
| 0075840 | 6/1977 | Japan . |
| WO90/08059 | 7/1990 | WIPO . |

*Primary Examiner*—Stephen Avila

[57] ABSTRACT

An artificial floating island is disclosed. The includes a floating structure formed from a plurality of hollow bottomless cells created by a plurality of hexagons and triangular cells. The resulting geometry creates a straight line for pre-stressing of reinforcing. The island is additionally composed of a primary cell, balance cells and secondary cells. The primary cell permits wave and swell action to travel under the structure with little disruption. The top of the secondary cells are polygonal domes for efficient containment of pressure.

4 Claims, 6 Drawing Sheets

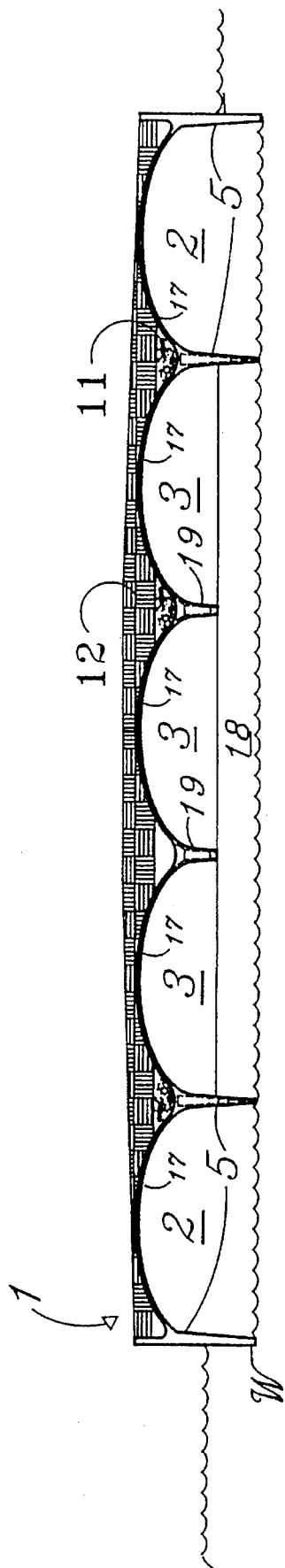
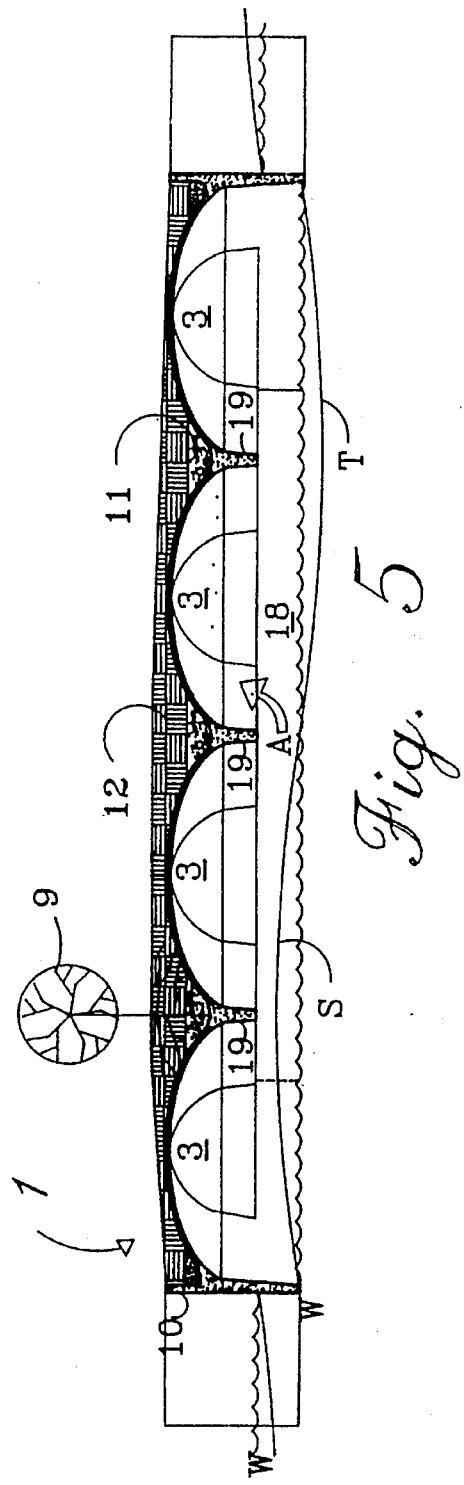

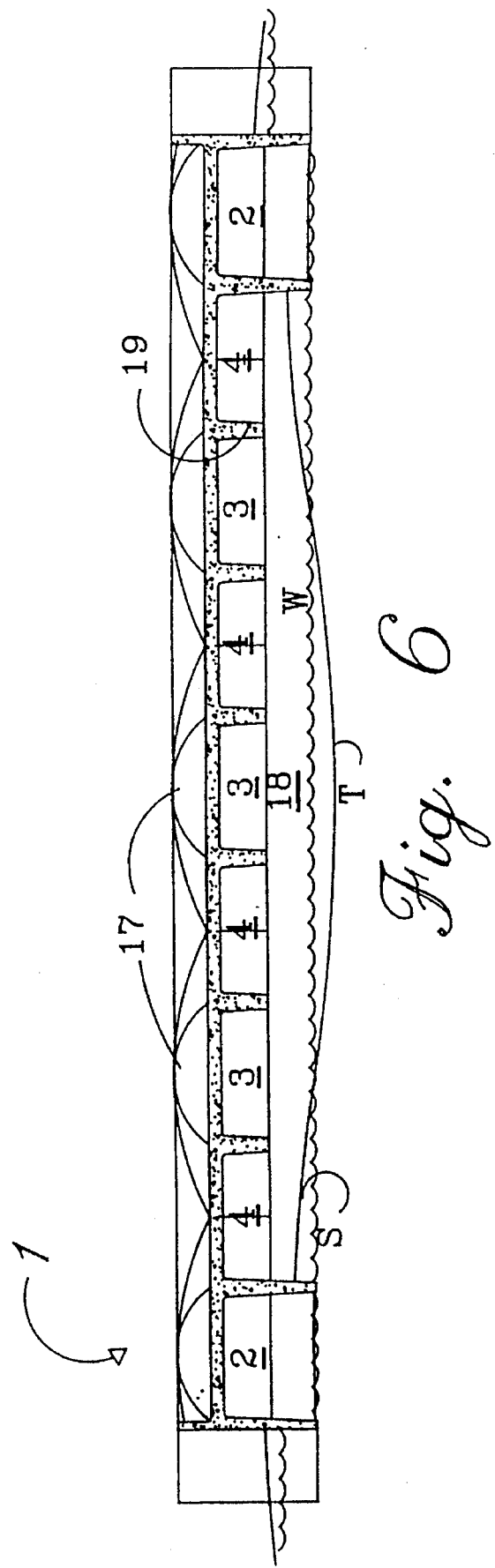

ARTIFICIAL FLOATING ISLAND

CROSS-REFERENCE TO RELATED APPLICATION

This is a continuation-in-part of application Ser. No. 08\167,062, filed Dec. 16, 1993 now U.S. Pat. No. 5,421,282.

BACKGROUND OF THE INVENTION

1. Field of the Invention

The present invention relates to a large bottomless concrete floating structures, more specifically to the partitioning of the floating structure and how this partitioning results in decreased structural costs, increased dynamic stability and drag reduction for when the island is being moved. The application will describe the construction and the method of construction for a large floating island.

2. Description of the Prior Art

It is advantageous to use, over bodies of water, floating platforms as floating Real Estate or Vessels. The Prior Art has addressed such issues, whereby concrete and other materials are utilized to form a bottomless net work of cells for buoyancy. The instant invention represents improvements over the Prior Art which fails to define a way an Artificial Island of bottomless design should be constructed for good dynamic stability, structural economy and lower drag.

U.S. Pat. No. 1,667,255 issued to Oscar Hermanson on Apr. 24, 1928 discloses a floating island where air is trapped thereby cushioning the structure from the waves. in FIG. 1 Oscar illustrates the partitioning of the structure from bow to stern and near the midpoint. This will decrease the desired cushioning effect. The optimum structure would transmit air from one end of the structure to the other, Mr. Hermanson's claim does not illustrate this. Secondly the structural systems geometry is inefficient and difficult to produce from concrete or steel. Swells of long wavelength could cause undue stresses to form in such a large rigid structure.

U.S. Pat. No. 2,488,542 issued to Amer L. Houghtailing on Nov. 22, 1949 discloses an Artificial Island. The same problems are evident here as described above, additionally Houghtailing uses a completely different method of floatation unrelated to my disclosure. The drag on such a structure in transit would also be very large.

U.S. Pat. No. 3,276,209 issued to Daryl R. Mosdell on Oct. 4, 1966 discloses a Floating Structure with open bottom. The top of each cell is flat and not curved, a curved top to each cell would lend itself to a more efficient structure, addition Mosdell provides no method of transmitting air pressure from one side to the other, Because of this, it would be difficult and expensive to create a large monolithic structure. No taper is provided to aid in the removal from the form work. By having the bottom of so many cells in contact with the water, drag is increase due to the water hitting the cell walls when the Structure is in transit.

U.S. Pat. No. 3,426,109 issued to Harry E. Dempster on Feb. 4, 1969 discloses a Method of Fabricating A Concrete Floatation Pier. Eccept for the tapered walls Demster has the same problems as I described above under Mosdell.

U.S. Pat. No. 3,490,407 issued to Harry E. Dempster on Jan. 20, 1970 is a divisional of U.S. Pat. No. 3,426,109 (see above) and discloses a Concrete Floating Structure as described in the first Demster patent.

U.S. Pat. No. 3,951,085 issued to Don E. Johnson et al. on Apr. 20, 1976 discloses a Floating Structure Arrangement formed of a plurality of cast triangular shapes. Again, the result is cell walls of the same height and with no allowance made for trapped air to travel from one side of the structure to the other, or minimizing structure and drag.

U.S. Pat. No. 4,155,323 issued to Klemens Finsterwalder on May 22, 1979 discloses a method for reducing pitching, rolling or dipping. Finsterwalder changes the effective mass of the Island by changing the amount of water ballast under the structure, this will have a stabilizing effect but is much different than the method used in the enclosed invention. Finsterwalder's invention cannot transmit air from one side of the structure to the other, which necessary to decrease the tendency of the structure to break in half when a large swell moves under the structure. Additionally the drag of such a structure would be quite large.

Japanese Patent JA 0075840 issued to Kiyonori Kikutake on Jun. 25, 1977 discloses a Method of Building a Floating Structure. The Structure comprises a plurality of individual cells rigidly interconnected with no way for the air to move from side to side, unlike the present invention. Kikutake's invention has increased drag and increased structural cost, unlike the present invention.

U.S. Pat. No. 1,908,714 issued to A. Schneider discloses a design which can be raised or lowered by changing the amount of water ballast in the system. The more mass that is added to the system the more difficult it is for a wave of a given size to move the structure. The present invention does not have to use water as ballast, instead, when the wave enters the large cell, air is displaced by the water and proceeds to move to the trough, in effect averaging the wave height between the crest and the trough. This effect is not seen in Schneider's disclosure. Other differences are sighted above.

Patent Cooperation Treaty Patent Application WO 90/08059 was filed by Ricardo Grechi and published on Jul. 26, 1990. The application discloses a Floating Concrete Platform formed of a plurality of hexagonal units. The cells are completely enclosed, rather than having a bottom open to the water as the present invention.

None of the above patents, taken either singly or in combination, is seen to describe the instant invention as claimed.

SUMMARY OF THE INVENTION

Accordingly, it is a principal object of the invention to provide an economical artificial floating island, or vessel.

It is the object of the invention to provide improved elements and arrangements thereof in an apparatus for the purpose described which is inexpensive, dependable and fully effective in accomplishing its intended purposes.

An artificial floating island or boat according to the invention may be formed from a plurality pre and/or post stressed concrete cells (or other material) of differing wall heights thereby forming, a primary or cell, perimeter balance cells and secondary smaller cells. The top of the secondary cells maybe curved to facilitate water collection and increase structural efficiency. The cell geometry is such that large and small cells, hexagons and triangles, are formed at the providing a straight line for the reinforcing of the concrete, facilitating the use of pre and/or post tensioned concrete. The length of each segment of cell wall is the same. By using a combination of triangles and hexagons we are able to provide straight beams for pre or post tensioning purposes while at the same time eliminating the unnecessary partitioning of the hexagon. The primary chamber provides a method of decreasing pitching and rolling due to waves; Stabilizing the structure and thereby decreasing the structural materials required. This is accomplished by using air pressure to in effect, average the crest of the wave with the trough and respectively providing uniform pressure to support the Structure. The Structure no longer has to be designed to span the distance between swells. The end result is a buoyant structure without the pitching caused by wave or swell action. The balance cells provide the minimum buoyancy at or near the perimeter necessary to prevent the structure from rolling into the water and sinking. The relatively small buoyant lift, (in comparison to the total buoyancy required,) generated by the balance cells at the perimeter of the structure, is not enough vertical force to break the structure in half when spanning between cells.

These and other objects of the present invention will become readily apparent upon further review of the following specifications and drawings.

BRIEF DESCRIPTION OF THE DRAWINGS

FIG. 4 is an sectional view in partial cross-section of the instant invention which sections through the balance cells and primary cell;

FIG. 5 is an environmental front view in partial cross-section which sections through the primary cell area;

FIG. 6 is a sectional view cut through the triangular cells with partial environmental elevation.

DETAILED DESCRIPTION OF THE PREFERRED EMBODIMENTS

Figure 1:
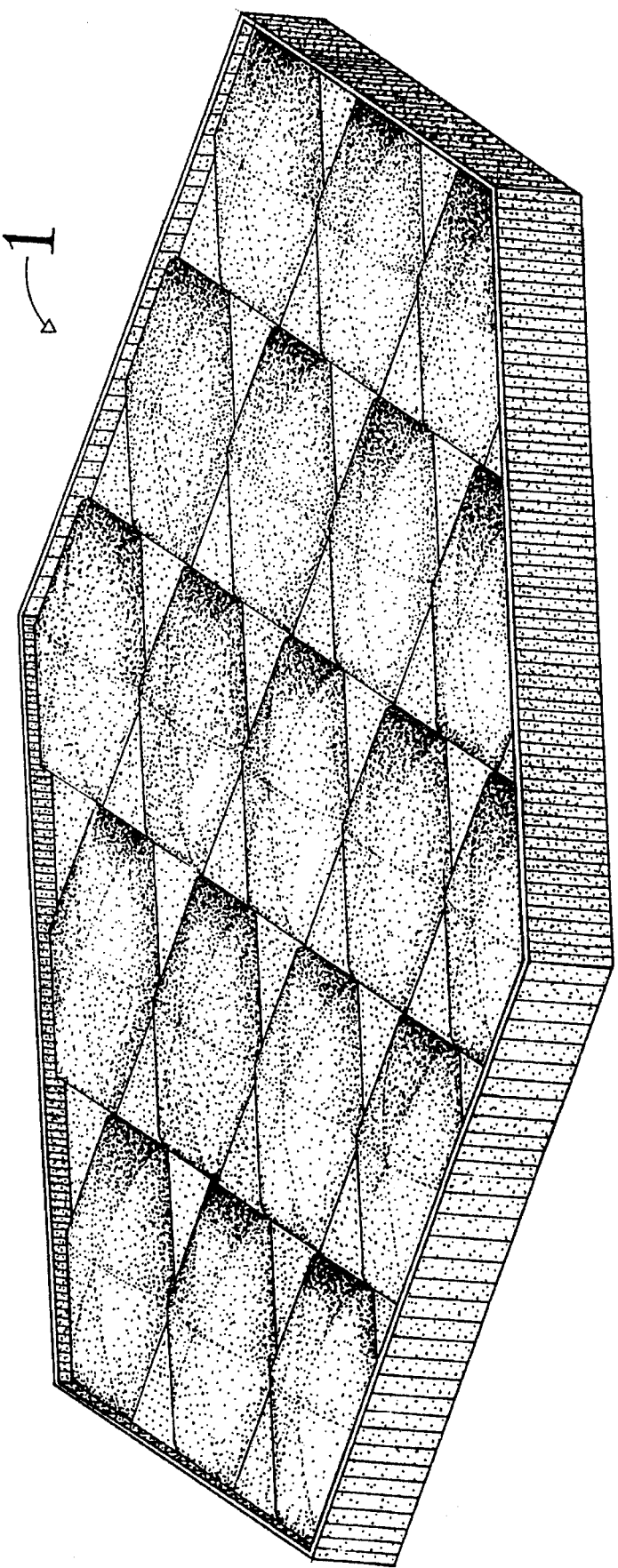
FIG. 1 is a isometric view of the top of the instant invention.

An Artificial floating island or vessel as shown in FIG. 1 from a top perspective.

Figure 2:
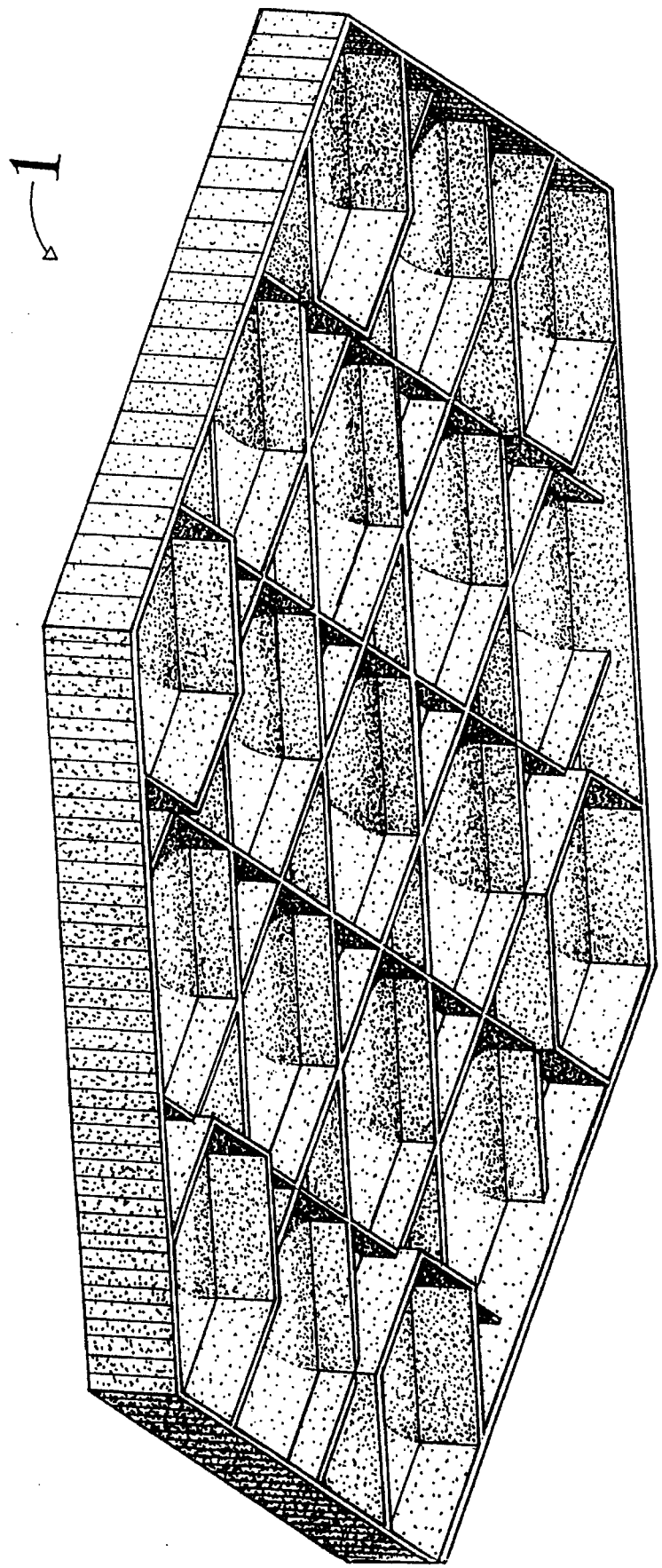
FIG. 2 is a isometric view of the bottom of the instant invention.

An Artificial floating island or vessel as shown in FIG. 2 from a bottom perspective.

Figure 3:
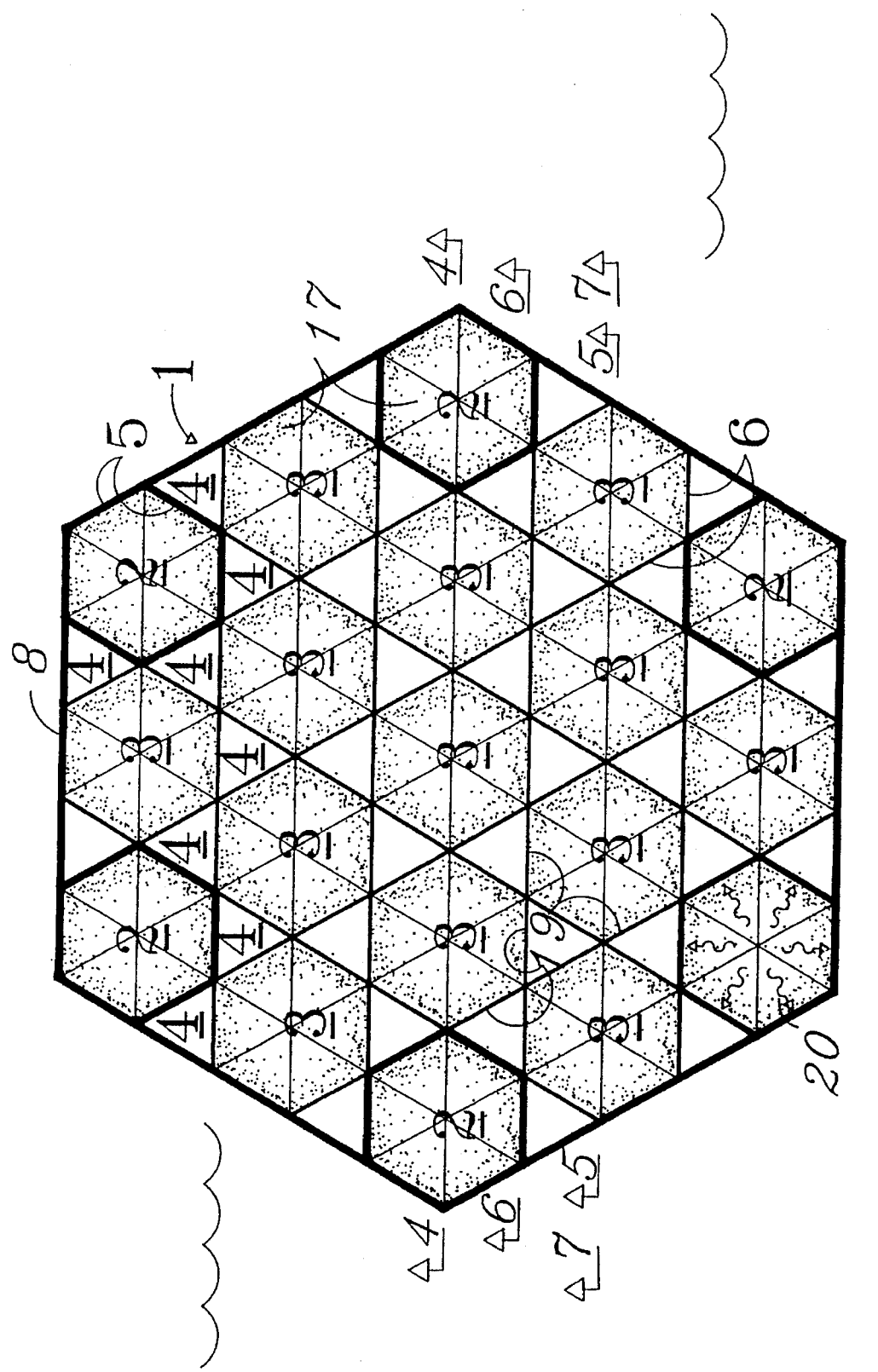
FIG. 3 is a top plan view of the instant invention shown without soil and landscaping.

An Artificial floating island or vessel 1, as shown in FIG. 3, the cellular partitioning of the instant invention is made up of hexagons 3 and 2, and triangles 4, although other geometry may be used, this combination provides straight beam lines for pre or post tensioning while at the same time keeping the horizontal span of each wall segment 6 the same or nearly the same. The balance cell walls 5, along with the perimeter walls 8, trap air in the balance cell 2. Secondary cell beams 19 intersect trajectories at 60 degree angles providing span capabilities and bracing in any direction. Secondary cells 3 do not normally terminate under the water W but remain above to provide for air movement in the primary cell 18 thereby providing a more uniform pressure under the said structure 1. The primary cell 18 is bounded by the perimeter walls less the internal balance cells 2. All hexagon cells in this preferred embodiment have a curved polygonal domes 17 depending from said beam lines. The said dome 17 contains pressure in a more efficient manner and thereby decreases structural costs. The dome also provides a sloped surface to direct water run off 20 and provides a deep soil area were trees may be planted.

FIG. 4, is a sectional view showing the balance cells 2 and secondary cells 3. Soil is shown on top of structure 12 and drainage rock 11. Water is collected in the drainage material 11 after flowing over the polygonal dome 17. Water W is shown displaced by air pressure under the island 1.

FIG. 5, is a sectional view showing the primary cell 18. Balance cells are beyond this section and therefore not shown. A tree 9 is shown planted in the region of deepest soil 12. A Swell S is shown moving under the structure 1. Air A is free to move laterally under the cell walls/beams 19, this in turn lessens the movement of the island 1 by maintaining a more uniform pressure. The trough T of the wave receives the air displaced by the swell S under the primary cell 18. A retaining wall 10 is shown as part of the perimeter wall 8.

FIG. 6, is a sectional view of the island 1 at the widest point of the triangles 3. The polygonal dome 17 is shown rising up from the hexagonal cells 2 and 3. A swell is shown moving under the island 1. The balance cells stop the island 1 from rolling into the water and sinking. Air is free to migrate from the swell to the trough an thereby keeping a uniform pressure under the primary cell 18. This uniform air pressure decreases the structure required by providing support between swells S. This decreases the structural cost significantly and lessens drag for when the island or vessel 1 is in transit.

Figure 7:
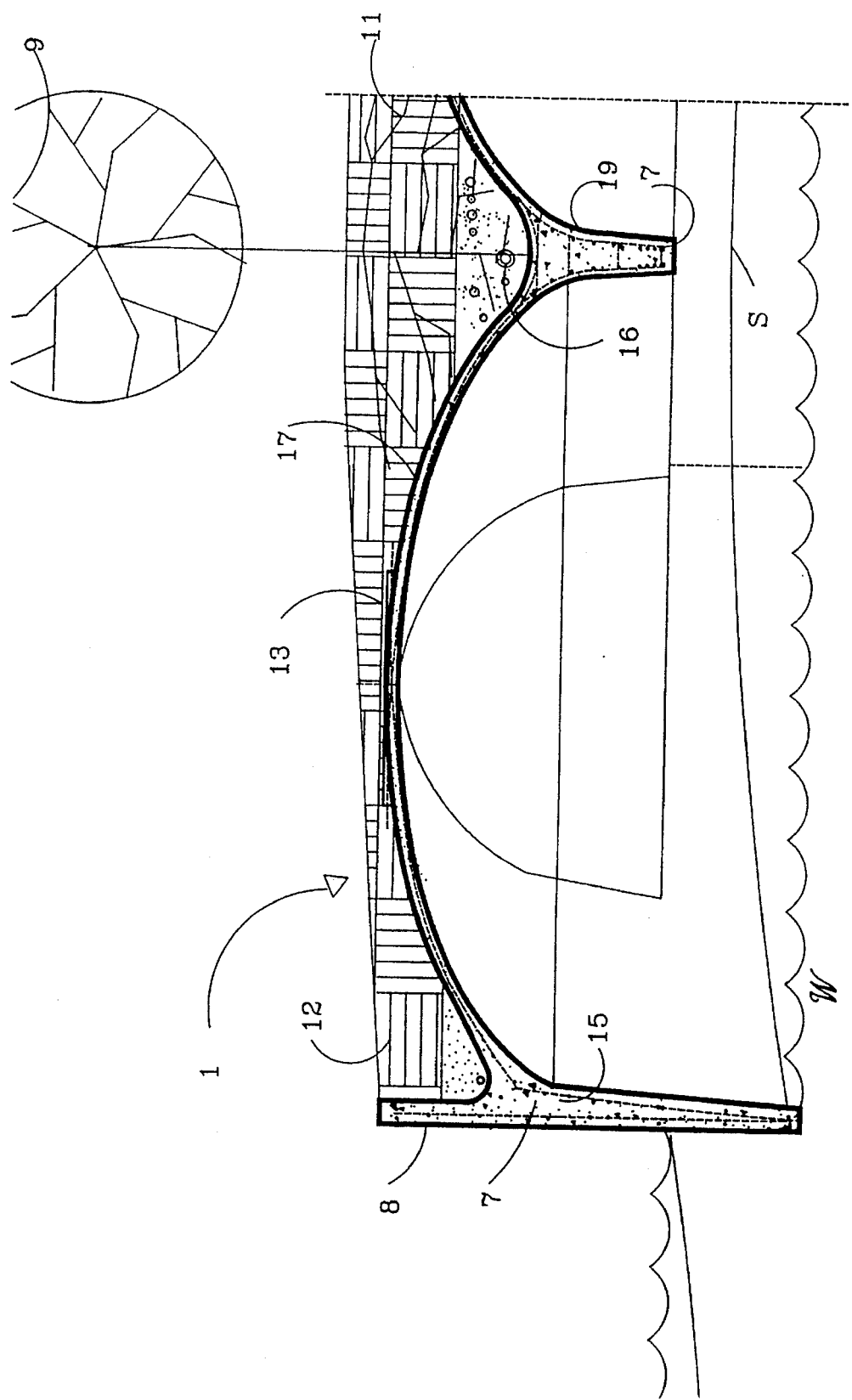
FIG. 7 is a sectional view of the cell wall which is also doubles as a reinforced beam.

FIG. 7, is a sectional view showing the reinforcing of the structure. Epoxy coated reinforcing strands 7 are shown and maybe pre or post tensioned. The polygonal dome is post tensioned and is pulled against a protrusion or edge cast in the concrete 13. Standard composite reinforcing may also be used here. The reinforcing continues down into the beams 19 and 8 transferring the lift created by the air pressure on the inside of the dome 17 to the beam. A tree is shown 9 planted in the soil 12 over the drainage course 11. Water maybe collected or drained by use of a drainage tile 16.

I claim:

1. A floating structure defining a plurality of cells, primary cells, secondary cells and balance cells, each of said cells comprising at least an upper containment platform;

a plurality of primary vertical walls depending from near the perimeter of grouped cells said upper platforms, said primary vertical walls terminating in free lower edges immersed in a body of water, air is contained in a space bounded by said platform and vertical walls;

a plurality of secondary side walls depending from said upper platform, said secondary side walls being arranged to subdivide each said cell into secondary cells, said secondary cells do not terminate in the water under normal operation, said secondary walls being shorter than each one of said primary walls;

a plurality of balance cells, providing a stability means, representing a smaller portion of the total buoyancy of said structure and preferably located near the perimeter of said structure, wall height is approximately equal to the said primary vertical walls and depending from said upper platform.

2. The artificial floating island of claim 1, wherein said upper containment platform of said secondary cells are curved.

3. An artificial island of claim 1, comprising a plan geometry made up of triangular cells and hexagonal cells, whereby said cell walls form continuous and straight beams, said geometry is composed of vertical walls depending from the said containment platform of approximately the same horizontal span length.

4. An artificial floating island comprising:

an artificial floating island defining a plurality of cells, primary cells, secondary cells and balance cells, each of said cells comprising at least an upper containment platform;

a plurality of primary vertical walls depending from near the perimeter of grouped cells said upper platforms, said primary vertical walls terminating in free lower edges immersed in a body of water, air is contained in a space bounded by said platform and vertical walls;

a plurality of secondary side walls depending from said upper platform, said secondary side walls being arranged to subdivide each said cell into secondary cells, said secondary cells do not terminate in the water under normal operation, said secondary walls being shorter than each one of said primary walls;

a plan geometry made up of triangular cells and hexagonal cells, whereby said cell walls form continuous and straight beams, said geometry is composed of vertical walls depending from the said containment platform of approximately the same horizontal span length.

* * * * *